UNITED STATES PATENT OFFICE.

CHRISTIAN HEINZERLING, OF FRANKFORT-ON-THE-MAIN, GERMANY.

ARTIFICIAL STONE.

SPECIFICATION forming part of Letters Patent No. 591,168, dated October 5, 1897.

Application filed July 23, 1894. Serial No. 518,393. (No specimens.)

*To all whom it may concern:*

Be it known that I, CHRISTIAN HEINZERLING, a subject of the Emperor of Germany, residing at Frankfort-on-the-Main, Germany, have invented an Improvement in the Manufacture of Artificial Stone, of which the following description is a specification.

Artificial stone is very useful in the arts by reason of its comparative cheapness and also because of the ease with which it can be produced in various shapes and forms; but artificial stone as now produced is open to quite serious objections.

The artificial stones are more porous or of less density than the natural stone, and consequently will more readily absorb moisture, so that frost frequently cracks or splits them, and the chemical and mechanical effects upon the materials used for their manufacture, more especially in stones of large dimensions, are not so thorough and uniform as they should be, resulting in a non-homogeneous mass, and in some instances the materials will fail entirely to combine in the interior of the mass.

This invention has for its object the production of artificial stone of great density whereby the foregoing defects are obviated, the stone produced in accordance with my invention being non-absorbent of moisture, and consequently free from the deleterious effects of frost, and uniform or homogeneous in its structure and characteristics throughout the whole mass.

In carrying out my invention the ingredients of which the stone is to be made—such as silicious pulverized material and lime with or without the addition of fibrous matter, which latter considerably increases the resistance—are thoroughly mixed in a dry state, packed or pressed into suitable sectional molds of the desired form, and placed in an air-tight closed vessel or chamber. The air is then exhausted from the said vessel or chamber by a suitable vacuum-pump, and then the agent or agents—such as steam, water, or carbonic-acid gas—for effecting the amalgamation of the ingredients will be introduced into the chamber, and as the air has been previously removed from the pores and interstices of the molded mass the water, steam, carbonic-acid gas, or other amalgamating agent will penetrate thereinto much faster and more completely and uniformly than would be otherwise possible, producing a much firmer and finer-grained stone, the internal pressure exerted by the chemical reactions of the ingredients still further solidifying the mass.

One-half of one per cent. to two per cent. of sodium or potassium salts—as, for instance, carbonate of soda or carbonate of potash—will further assist in the petrifaction of the composition.

The artificial stone may be made waterproof or non-absorbent of moisture, or rendered insulating for electrotechnical purposes, or rendered readily susceptible to polish by applying thereto hot molten paraffin, stearin, Canauba or Japanese wax, or similar substances, either by brushing or by immersing the stone in a molten bath of the substance.

If it is desired to have the paraffin or other substance penetrate the stone very deeply, it must remain for a time in the heated molten substance *in vacuo.*

In making artificial limestone the composition is molded and treated with water or steam *in vacuo*, as described, after which the air is again exhausted from the air-tight receiver or vessel and the composition is subjected to the action of carbonic acid under a pressure preferably of several atmospheres, and this latter treatment with the carbonic-acid gas *in vacuo* may be repeated several times, if desired.

The bearing quality of the stone may be increased, especially if made in large plates, by introducing therein one or more layers of reticulated wire or other fabric before the "petrifaction," as it may be called, is carried out.

In some cases where it is advantageous to reduce the weight of the stone it is preferable to so mold or shape the material that channels or interior spaces will be formed in it, materially reducing the weight, but not lessening the strength or resistance of the finished stone.

Any desired forms may be given to the artificial stone—such as tubes, pipes, columns, &c.—which may be treated by any of the herein-described methods.

I have found that any kind of clean sand, pulverized slate, or other stone containing, preferably, from forty to sixty per cent. of silicic acid may be used as a base, thoroughly mixed in a dry state with from seven to twenty per cent. or more of burned lime, partially slaked or altogether unslaked, according to the chemical composition of the base. To such mixtures the alkali salts mentioned are added in various proportions, depending upon the composition of the materials forming the composition.

I claim—

1. The herein-described method of manufacturing artificial stone, which consists in compressing the mixed ingredients in a dry state in suitable molds, thereafter exhausting the air, and then introducing an amalgamating agent into the thus-exhausted ingredients and while still substantially *in vacuo*, substantially as described.

2. The herein-described method of manufacturing artificial stone, which consists in compressing the mixed ingredients in a dry state in suitable molds, thereafter exhausting the air, then introducing an amalgamating agent into the thus-exhausted ingredients and while still substantially *in vacuo*, and finally treating the stone with a melted oleaginous substance, substantially as described.

3. The herein-described method of manufacturing artificial stone, which consists in mixing dry pulverized silicious material and burnt lime, compressing in suitable molds, exhausting the air therefrom, subjecting the mass to the action of a fluid amalgamating agent, again exhausting the air, and introducing carbonic-acid gas under pressure, substantially as described.

In testimony whereof I have signed my name to this specification in the presence of two subscribing witnesses.

CHRISTIAN HEINZERLING.

Witnesses:
JOHN C. EDWARDS,
FREDERICK L. EMERY.